United States Patent
Kashihara et al.

(10) Patent No.: US 6,258,477 B1
(45) Date of Patent: Jul. 10, 2001

(54) EXPLOSION-PROOF NONAQUEOUS ELECTROLYTE SECONDARY CELL AND RUPTURE PRESSURE SETTING METHOD THEREFOR

(75) Inventors: Yoshihiro Kashihara; Katsuhiko Mori, both of Osaka; Kenjin Masumoto, Hyougo; Kunio Tsuruta, Nara, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/341,457
(22) PCT Filed: Nov. 10, 1998
(86) PCT No.: PCT/JP98/05051
  § 371 Date: Sep. 9, 1999
  § 102(e) Date: Sep. 9, 1999
(87) PCT Pub. No.: WO99/25037
  PCT Pub. Date: May 20, 1999

(30) Foreign Application Priority Data

Nov. 11, 1997 (JP) .................................................. 9-308294

(51) Int. Cl.[7] .................................................. H01M 2/00
(52) U.S. Cl. .................................................. 429/53; 429/56
(58) Field of Search .................................. 429/53, 54, 56; 220/580

(56) References Cited

U.S. PATENT DOCUMENTS 4,943,497  7/1990  Oishi et al. .
5,741,606  4/1998  Mayer et al. .
5,853,912  * 12/1998  Naing et al. .......................... 429/61

FOREIGN PATENT DOCUMENTS

| 0217725 | 9/1986 | (EP) . |
| 0262070 | 8/1987 | (EP) . |
| 0818838 | 1/1998 | (EP) . |
| 6-333548 | 12/1994 | (JP) . |
| 8-306351 | 11/1996 | (JP) . |
| 9-180698 | 7/1997 | (JP) . |

OTHER PUBLICATIONS

Japanese search report for Int'l Appln No. PCT/JP98/05051 dated Feb. 2, 1999.

* cited by examiner

Primary Examiner—Gabrielle Brouillette
Assistant Examiner—M. Wills
(74) Attorney, Agent, or Firm—Ratner & Prestia

(57) ABSTRACT

An explosion-proof non-aqueous electrolyte battery is provided which has a current cutoff device for cutting off electrical connection within the battery with safety and certainty in the event of overcharge while remaining inoperable in normal use or in storage at an elevated temperature. A pair of an upper vent plate 1 and a lower vent plate 2 mechanically and electrically coupled with each other is provided on the sealing part of-the battery where the mechanical coupling of the pair of the upper vent plate 1 and the lower vent plate 2 is so configured as to rupture and cut off an electric current in the event the internal pressure of the battery case increases beyond a predetermined value, and the rupture pressure at which the mechanical coupling between the pair of upper vent plate 1 and the lower vent plate 2 is broken has been set to decrease as the spatial volume occupancy ratio of the battery increases.

17 Claims, 2 Drawing Sheets

EXPLOSION-PROOF NONAQUEOUS ELECTROLYTE SECONDARY CELL AND RUPTURE PRESSURE SETTING METHOD THEREFOR

This application is a U.S. National Phase Application of PCT International Application PCT/JP98/05051.

FIELD OF THE INVENTON

The present invention relates to an explosion-proof non-aqueous electrolyte secondary battery adaptable to lithium secondary batteries and the like.

BACKGROUND OF THE INVENTION

In recent years there has been a rapid progress in portable and cordless designs of electronic equipment such as audio-visual equipment and personal computers. As the power source of these equipment, non-aqueous electrolyte (organic solvent type liquid electrolyte) secondary batteries as represented by various types of high-capacity alkaline storage batteries and lithium-ion secondary batteries are suitable. Furthermore, as a result of an effort of developing sealed type versions with a high energy density and superior load characteristic, sealed type non-aqueous electrolyte secondary batteries are in wide use as the power source of portable equipment including watches and cameras.

Now, with the non-aqueous electrolyte secondary battery, a chemical change in the power generating elements inside the battery takes place in the event of failure of applied equipment including the charger, overcharge, or misuse. For instance, an abnormal reaction due to overcharge or short circuit decomposes the electrolyte or active materials, thus causing unusual gas evolution inside the battery and an excessive internal pressure of the battery. For this reason this type of batteries has to date been provided with the following explosion-proof mechanism. That is, in the event the battery internal pressure increases beyond a designed value, a vent member that has been exerted with the internal pressure is pressed toward the direction of the internal pressure (the direction of diffusion of the internal pressure) and deformed, thereby causing rupture of a thin portion of electrically conducting member or separation of the weld between the vent member and the electrically conducting member thus cutting off the electric current in the initial stage of occurrence of overcharge or short circuit and stopping the abnormal reaction. As a result, an increase in the battery temperature or battery internal pressure due to charging current or short-circuit current can be controlled and safety of the battery is secured.

The battery structure disclosed in U.S. Pat. No. 4,943,497 is valuable in that it provides a commercially useful product which is fully protected internally against overcharge. The gas evolution mechanism which activates the cutoff device depends on the voltage and temperature of the battery and on time. The speed of gas evolution is not constant; it increases with increasing voltage and temperature of the battery. It is of special significance to note in actual use of the battery that evolution of a gas continues with time at predetermined voltage and temperature. While it is required that evolution of a gas during overcharge assures safe stoppage of battery operation, sustained evolution of the gas in normal operation must be avoided. Unless gas evolution can be avoided, decomposition product of the gas will accumulate with time causing an increase in the gas pressure presenting a possibility of operation of the cutoff device in normal use.

By a proper selection of the liquid electrolyte and positive active material, safety requirements can actually be satisfied to a certain degree. However, these requirements hinder the selection because of such other reasons as cost, complexity, and energy density. Furthermore, when the gas evolution continues in a completely sealed battery, the maximum life of the cutoff device will be limited.

The prime object of the present invention is to provide a safe and explosion-proof non-aqueous electrolyte secondary battery which is equipped with a cutoff device for cutting off electrical connection within the battery with safety and certainty in the event of overcharge while remaining inoperable in normal use or storage at an elevated temperature, and which is free from the danger of explosion by combination and optimization of safety devices and superior in safety in the event of evolution of a gas in excess of the gas discharge capacity as a result of abandonment or throwing into fire of the battery.

SUMMARY OF THE INVENTION

In order to achieve the above object, the present invention provides a structure in which a sealing part includes a pair of upper and lower vent plates mechanically and electrically coupled with each other, the mechanical coupling between the pair of upper and lower vent plates being broken in the event the internal pressure of the battery case increases beyond a predetermined value thus cutting off the electric current, and, in the event the internal pressure of the battery case further increases beyond a predetermined value an easy-to-break portion formed on the upper vent plate ruptures so that the gas inside the battery case be released to outside. Here the rupture pressure at which the mechanical coupling between the pair of upper and lower vent plates is broken is set in a manner that it decreases as the spatial volume occupancy ratio of the battery increases, and the rupture pressure of the easy-to-rupture portion of the upper vent plate is set at a value in the range 18–24 $kgf/cm^2$.

Furthermore, the present invention provides a structure in which a sealing part includes a pair of upper and lower vent plates mechanically and electrically coupled with each other, the mechanical coupling between the pair of upper and lower vent plates being broken in the event the internal pressure of the battery case increases beyond a predetermined value thus cutting off the electric current, and, in the event the internal pressure of the battery case further increases beyond a predetermined value an easy-to-break portion formed on the upper vent plate rupturingso that-theg the battery case be released to outside. Also an easy-to-rupture portion is formed on the bottom surface of the battery case the rupture pressure of which being set higher than the rupture pressure of the easy-to-rupture portion of the upper vent plate by at least 16 $kgf/cm^2$, and the caulking withstand pressure of the sealing part is set higher than the upper limit of the rupture pressure of the easy-to-rupture portion formed on the bottom surface of the battery case by at least 10 $kgf/cm^2$.

According to the above described invention, a safe and explosioin-proof non-aqueous secondary battery is provided which is equipped with a cutoff device for cutting off electrical connection within the battery with safety and certainty in the event of overcharge while remaining inoperable in normal use or storage at an elevated temperature, and which is free from the danger of explosion by combination and optimization of safety devices and superior in safety in the event of evolution of a gas in excess of the gas discharge capacity as a result of abandonment or throwing into fire of the battery.

DESCRIPTION OF THE PREFERRED EMBODIMENTS

Figure 1:
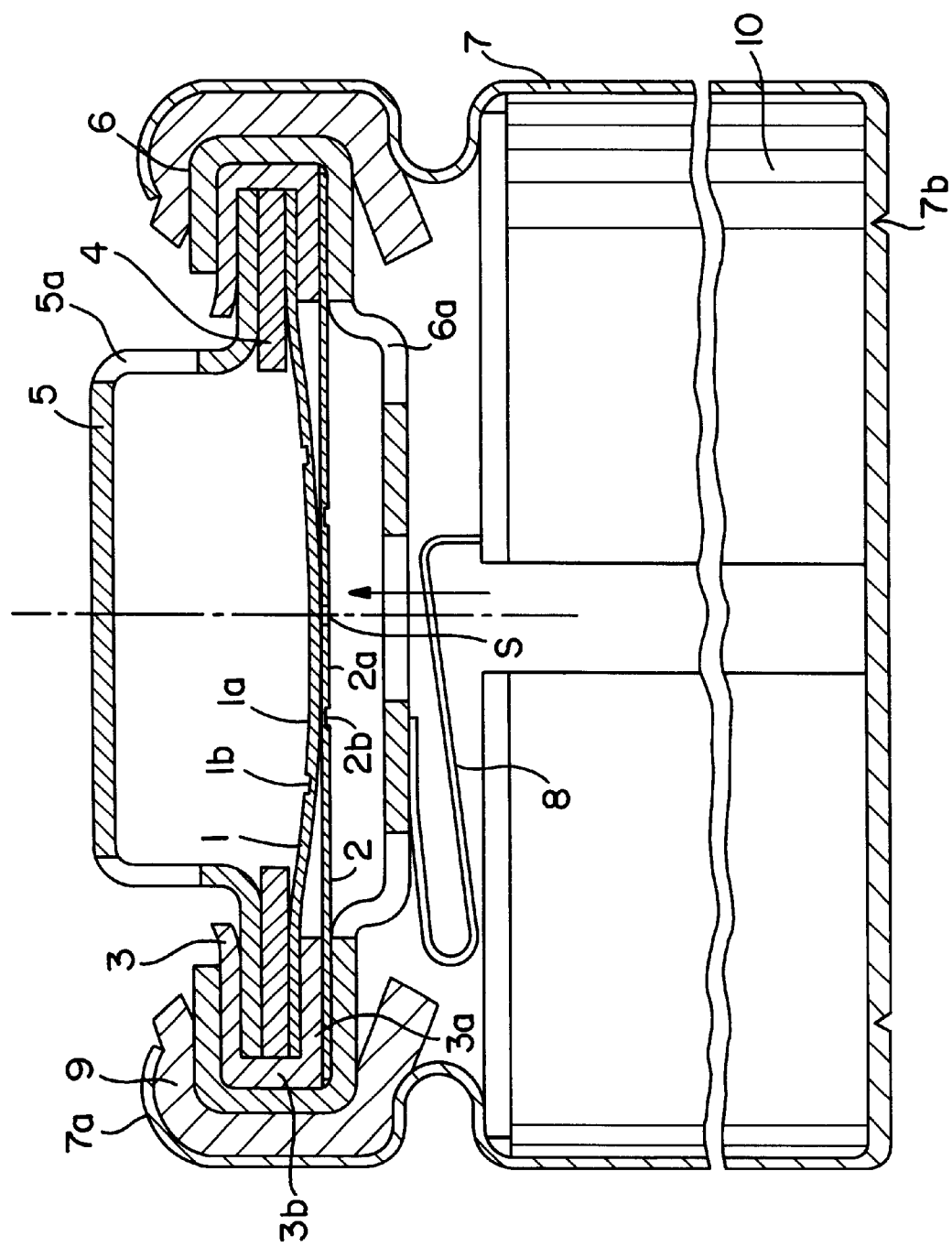
FIG. 1 is a vertical cross-sectional view of an explosion-proof battery in an exemplary embodiment of the present invention.
Figure 2:
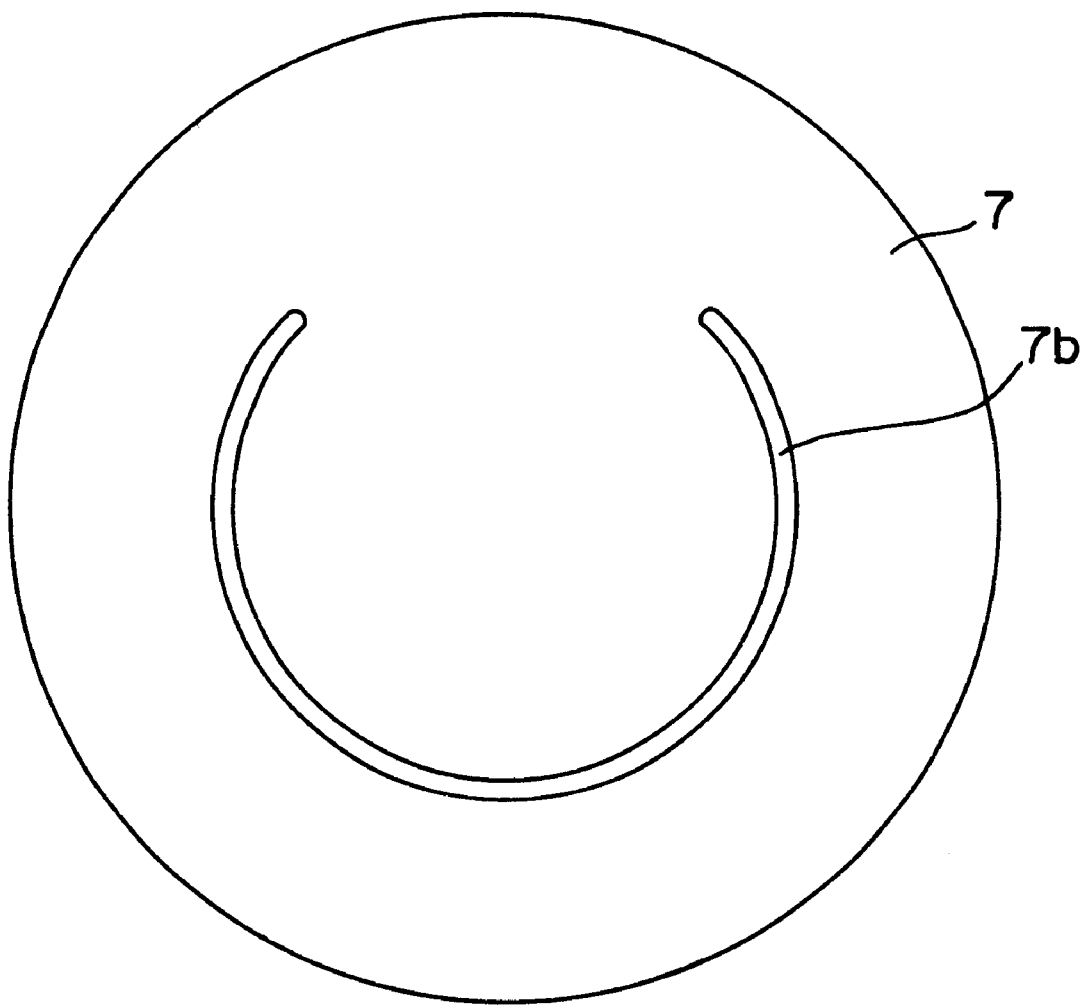
FIG. 2 is a bottom view of the battery.

Preferred embodiments of the present invention are described in the following with reference to drawings. FIG. 1 is a vertical cross-sectional view of an explosion-proof lithium secondary battery in an exemplary embodiment of the present invention. In the figure, the explosion-proof seal plate employed in the battery includes an upper vent member (upper vent plate) 1 composed of a thin metal foil, a lower vent member (lower vent plate) 2 composed of a thin metal foil and disposed opposite to the upper vent member 1, a ring-shaped insulating inner gasket 3 interposed between the peripheries of each of the upper vent member 1 and the lower vent member 2, a ring-shaped PTC device 4 placed on top of the periphery of the upper vent member 1, a metal cap 5 laid on top of the PTC device 4 and having 6 discharge holes 5a, and a metal case 6 made of aluminum for receiving and securing each of the above members under a stacked condition and having 4 ventilation holes.

The inner gasket 3 is made of synthetic resin having resistance to liquid electrolyte, for example silane-cross-linked polypropylene type polymer, formed in a manner that a tubular portion 3b extends upwardly from the outer edge of a ring-shaped periphery 3a. The upper vent member 1 is composed of an aluminum disk, 0.15 mm in thickness and 12.7 mm in outer diameter, for example, and has a central concave portion 1a downwardly swelling into a curvature surface, and an easy-to-rupture thin annular C-letter shape portion 1b formed on the circumference of the concave portion 1a by using a C-letter shape stamp.

The lower vent member 2 is composed of an aluminum disk 0.1 mm in thickness and 13.5 mm in outer diameter, for example, and has an easy-to-rupture thin portion 2b formed on the circumference of the central portion 2a by using an annular stamp. The thin portion 2b has a rupture strength such that it ruptures when the battery internal pressure reaches a predetermined value, and the rupture strength is set at a value lower than the rupture strength of the thin portion 1b of the upper vent member 1.

The central portions of each of the upper vent member 1 and the lower vent member 2 are welded to form a bonded part S, and the upper vent member 1 and the lower vent member 2 are electricafly connected only through the bonded part S. The PTC device 4 is a positive temperature coefficient resistance element the electrical resistance of which drastically increases when a predetermined temperature range is exceeded by passage of an electric current in excess of a predetermined value.

Next, a brief description of a battery obtained by sealing the opening of the battery case 7 with the above described explosion-proof seal plate will be given. First, in inserting the explosion-proof seal plate into the battery case 7 having a thin portion 7b on the bottom, a lead member 8 taken out from one of the electrodes (usually positive electrode) of an electrode group 10 housed inside the battery case 7 is connected by welding with a battery case 6, followed by pouring liquid electrolyte in the electrode group 10 and fitting the explosion-proof seal plate to inside of the opening of the battery case 7 with intervention of an insulating gasket 9 on the circumference. Subsequently, the peripheral edge portion 7a of the opening of the battery case 7 is caulked inward thus sealing the battery case 7 with the explosion-proof seal plate. In the meantime, the thin portion 7b pr C-letter shape and forms an easy-to-rupture portion.

The electric current of this battery flows from the electrode group 10 housed inside the battery case 7 through the lead member 8, metal case 6, lower vent member 2, bonded part S, upper vent member 1, PTC device 4, to the metal cap 5 which also serves as an external terminal thereby enabling the battery to function. Here, in the event an excessive current flows, the PTC device 4 reaches at the operating temperature in a short period of time and increases its resistance thus greatly reducing the current and maintaining it at a low level. As a result severe damage of the battery due to external short circuit or misuse at an excessively large current may be prevented.

In the event of overcharge or reverse charge due to failure of the charger, or overdischarge of many batteries connected in series, it often happens that the current exceeds the allowable safety limit even though it is below the operating current of the PTC device 4 and the battery internal pressure increases. When the battery internal pressure reaches a predetermined value established based on the rupture strength of the thin portion 2b of the lower vent member 2, a part of the thin portion 2b of the lower vent member 2 which receives the battery internal pressure through a ventilation (breathing) hole 6a ruptures, and by the pressure received through the ruptured part the upper vent member 1 is deformed upward by the flip of the concave portion 1a triggering rupture of the thin portion 2b of the lower vent member 2 by shearing. As a result, the portion encircled by the thin portion 2b of the lower vent member 2 is removed away from the lower vent member 2 together with the upper vent member 1, thus the upper vent member 1 and the lower vent member 2 which have been electrically conducting only through the bonded part S are separated, thus cutting off the electric current.

In the event the battery internal pressure further continues to increase due to evolution of a large volume of gas and the battery internal pressure reaches a predetermined value established based on the rupture strength of the thin portion 1b of the upper vent member 1, the thin portion 1b ruptures open and the filled gas is discharged to outside of the battery through the discharge holes 5a.

In the event the battery internal pressure continues to rapidly increase and the battery internal pressure reaches the rupture strength of the thin portion 7b of the bottom of the battery case 7, the thin portion 7b ruptures open and the filled gas is discharged to outside of the battery.

Example cylindrical batteries A1 to A7 having the above structure were fabricated as follows. A battery having a spatial volume occupancy ratio, being volume ratio of the empty space in the total space occupied by the battery (namely, the space not constituting a power generation element), of 15–20% and using a seal plate having a rupture pressure of the lower vent member 2 set at 3–11 $kgf/cm^2$ is designated A1, a battery having a spatial volume occupancy ratio of 10–14% and using a seal plate having a rupture pressure of the lower vent member 2 set at 4–13 $kgf/cm^2$ is designated A2, a battery having a spatial volume occupancy ratio of 9% and using a seal plate having a rupture pressure of the lower vent member 2 set at 5–13 $kgf/cm^2$ is designated A3, a battery having a spatial volume occupancy ratio of 8% and using a seal plate having a rupture pressure of the lower vent member 2 set at 5.5–13 $kgf/cm^2$ is designated A4, a battery having a spatial volume occupancy ratio of 7% and using a seal plate having a rupture pressure of the lower vent member 2 set at 7–13 $kgf/cm^2$ is designated A5, a battery having a spatial volume occupancy ratio of 6% and using a seal plate having a rupture pressure of the lower vent member 2 set at 9–14 $kgf/cm^2$ is designated A6, and a battery having a spatial volume occupancy ratio of 5% and using a seal plate having a rupture pressure of the lower vent member 2 set at 13–15 kgf/cm² is designated A7.

Also, example rectangular batteries F1 to F5 were fabricated by setting the rupture pressure of the lower vent member 2 as follows. A battery having a spatial volume occupancy ratio of 15–20% and using a seal plate having a rupture pressure of the lower vent member 2 set at 2–5 kgf/cm² is designated F1, a battery having a spatial volume occupancy ratio of 10–14% and using a seal plate having a rupture pressure of the lower vent member 2 set at 3–7 kgf/cm² is designated F2, a battery having a spatial volume occupancy ratio of 7–9% and using a seal plate having a rupture pressure of the lower vent member 2 set at 4–7 kgf/cm² is designated F3, a battery having a spatial volume occupancy ratio of 6% and using a seal plate having a rupture pressure of the lower vent member 2 set at 4–9 kgf/cm² is designated F4, and a battery having a spatial volume occupancy ratio of 5% and using a seal plate having a rupture pressure of the lower vent member 2 set at 6–10 kgf/cm² is designated F5. Here, the rupture pressure (operating pressure) of the thin portion is measured by gas pressurization.

Results of overcharge test, elevated-temperature storage test, and fire throw in test of these batteries are described in the following.

(1) Overcharge Test:

The overcharge test is a test assuming overcharge under an uncontrolled condition such as due to failure of the charger. The status of each of the batteries after the test was observed. As comparative examples of cylindrical batteries, a battery having a spatial volume occupancy ratio of 15–20% and using a seal plate having a rupture pressure of the lower vent member 2 set at 13 kgf/cm² is designated B1, a battery having a spatial volume occupancy ratio of 10–14% and using a seal plate having a rupture pressure of the lower vent member 2 set at 14 kgf/cm² is designated B2, a battery having a spatial volume occupancy ratio of 6% and using a seal plate having a rupture pressure of the lower vent member 2 set at 15 kgf/cm² is designated B3, and a battery having a spatial volume occupancy ratio of 5% and using a seal plate having a rupture pressure of the lower vent member 2 set at 16 kgf/cm² is designated B4.

On the other hand, as comparative examples of rectangular batteries, a battery having a spatial volume occupancy ratio of 15–20% and using a seal plate having a rupture pressure of the lower vent member 2 set at 6 kgf/cm² is designated G1; a battery having a spatial volume occupancy ratio of 7–14% and using a seal plate having a rupture pressure of the lower vent member 2 set at 8 kgf/cm² is designated G2, a battery having a spatial volume occupancy ratio of 6% and using a seal plate having a rupture pressure of the lower vent member 2 set at 10 kgf/cm² is designated G4, and a battery having a spatial volume occupancy ratio of 5% and using a seal plate having a rupture pressure of the lower vent member 2 set at 11 kgf/cm² is designated G5. Table 1 shows results of overcharge test of the example batteries of the present invention and comparative examples.

TABLE 1

| Battery type | | Spatial volume occupancy ratio (%) | Lower vent member rupture pressure (kgf/cm²) | Overcharge ignition ratio |
|---|---|---|---|---|
| Cylindrical batteries | | | | |
| Examples | A1 | 15–20 | 3–11 | 0/100 |
|  | A2 | 10–14 | 4–13 | 0/100 |
|  | A3 | 9 | 5–13 | 0/100 |
|  | A4 | 8 | 5.5–13 | 0/100 |
|  | A5 | 7 | 7–13 | 0/100 |
|  | A6 | 6 | 9–14 | 0/100 |
|  | A7 | 5 | 13–15 | 0/100 |
| Comparative examples | B1 | 15–20 | 13 | 97/100 |
|  | B2 | 10–14 | 14 | 93/100 |
|  | B3 | 6 | 15 | 94/100 |
|  | B4 | 5 | 16 | 96/100 |
| Rectangular batteries | | | | |
| Examples | F1 | 15–20 | 2–5 | 0/100 |
|  | F2 | 10–14 | 3–7 | 0/100 |
|  | F3 | 7–9 | 4–7 | 0/100 |
|  | F4 | 6 | 4–9 | 0/100 |
|  | F5 | 5 | 6–10 | 0/100 |
| Comparative examples | G1 | 15–20 | 6 | 97/100 |
|  | G2 | 7–14 | 8 | 95/100 |
|  | G4 | 6 | 10 | 92/100 |
|  | G5 | 5 | 11 | 94/100 |

From the results of Table 1, it can be seen that while the comparative example cylindrical batteries B1–B4 and rectangular batteries G1–G5 had ignited, none of the cylindrical batteries A1–A7 and rectangular batteries F1–F5 of examples of the present invention have reached the state of igniting. With the comparative example batteries B1–B4 and G1–G5, the timing of cutting off the electrical connection for an electric current was delayed as the rupture pressure of the lower vent member 2 was high, and decomposition of the electrolyte continued, resulting in an increase in the battery internal pressure and continued rise in the battery temperature. The battery thermal runaway start temperature was eventually reached thus releasing oxygen-containing gas and ending in ignition.

On the other hand, with each of the example batteries A1–A7 and F1–F5 of the present invention, an optimum rupture pressure for each respective spatial volume occupancy ratio has been set and the timing of cutting off electrical connection for an electric current was never delayed. Consequently, the thermal runaway temperature was never reached due to continued rises in the battery internal pressure and temperature thus never resulting in ignition.

(2) Elevated-Temperature Storage Test:

The elevated-temperature storage test is a test to store a battery in a 85° C. thermostat oven for 3 days. Status of the battery after the test is observed. As comparative examples of cylindrical batteries, a battery having a spatial volume occupancy ratio of 15–20% and using a seal plate having a rupture pressure of the lower vent member 2 set at 2 kgf/cm² is designated C1, a battery having a spatial volume occupancy ratio of 10–14% and using a seal plate having a rupture pressure of the lower vent member 2 set at 3 kgf/cm² is designated C2, a battery having a spatial volume occupancy ratio of 9% and using a seal plate having a rupture pressure of the lower vent member 2 set at 4 kgf/cm² is designated C3, a battery having a spatial volume occupancy ratio of 8% and using a seal plate having a rupture pressure of the lower vent member 2 set at 5 kgf/cm² is designated C4, a battery having a spatial volume occupancy ratio of 7% and using a seal plate having a rupture pressure of the lower vent member 2 set at 6 kgf/cm² is designated C5, a battery having a spatial volume occupancy ratio of 6% and using a seal plate having a rupture pressure of the lower vent member 2 set at 8 kgf/cm$^2$ is designated C6, and a battery having a spatial volume occupancy ratio of 5% and using a seal plate having a rupture pressure of the lower vent member 2 set at 12 kgf/cm$^2$ is designated C7.

Furthermore, as comparative examples of rectangular batteries, a battery having a spatial volume occupancy ratio of 15–20% and using a seal plate having a rupture pressure of the lower vent member 2 set at 1 kgf/cm$^2$ is designated H1, a battery having a spatial volume occupancy ratio of 7–14% and using a seal plate having a rupture pressure of the lower vent member 2 set at 2 kgf/cm$^2$ is designated H2, a battery having a spatial volume occupancy ratio of 6% and using a seal plate having a rupture pressure of the lower vent member 2 set at 3 kgf/cm$^2$ is designated H4, and a battery having a spatial volume occupancy ratio of 5% and using a seal plate having a rupture pressure of the lower vent member 2 set at 5 kgf/cm$^2$ is designated H5. Table 2 shows results of elevated-temperature storage test of example batteries of the present invention and comparative example batteries.

TABLE 2

| Battery types | | Spatial volume occupancy ratio (%) | Lower vent member rupture pressure (kgf/cm$^2$) | Ratio of erroneous current cutoff |
|---|---|---|---|---|
| Cylindrical batteries | | | | |
| Examples | A1 | 15–20 | 3–11 | 0/100 |
| | A2 | 10–14 | 4–13 | 0/100 |
| | A3 | 9 | 5–13 | 0/100 |
| | A4 | 8 | 5.5–13 | 0/100 |
| | A5 | 7 | 7–13 | 0/100 |
| | A6 | 6 | 9–14 | 0/100 |
| | A7 | 5 | 13–15 | 0/100 |
| Comparative examples | C1 | 15–20 | 2 | 96/100 |
| | C2 | 10–14 | 3 | 92/100 |
| | C3 | 9 | 4 | 98/100 |
| | C4 | 8 | 5 | 93/100 |
| | C5 | 7 | 6 | 94/100 |
| | C6 | 6 | 8 | 97/100 |
| | C7 | 5 | 12 | 93/100 |
| Rectangular batteries | | | | |
| Examples | F1 | 15–20 | 2–5 | 0/100 |
| | F2 | 10–14 | 3–7 | 0/100 |
| | F3 | 7–9 | 4–7 | 0/100 |
| | F4 | 6 | 4–9 | 0/100 |
| | F5 | 5 | 6–10 | 0/100 |
| Comparative examples | H1 | 15–20 | 1 | 92/100 |
| | H2 | 7–14 | 2 | 95/100 |
| | H4 | 6 | 3 | 97/100 |
| | H5 | 5 | 5 | 94/100 |

It can be seen from Table 2 that, while erroneous current cutoff operation of seal plates took place with the comparative example batteries C1–C7 and H1–H5 thus cutting off electrical conduction in the batteries and not performing as batteries, no erroneous current cutoff operation of seal plates took place with the example batteries A1–A7 and F1–F5 of the present invention. In this test, as a result of exposing batteries to an elevated temperature of 85° C., the internal pressure rose due to evaporation of the liquid electrolyte and volume expansion of the evolving gas. With the comparative example batteries C1–C7 and H1–H5, electrical connection for the electric current was erroneously cutoff because the rupture pressure of the lower vent member 2 of the seal plate was low. On the other hand, with the example batteries A1–A7 and F1–F5 of the present invention, electrical connection for the electric current was not erroneously cutoff because the rupture pressure had been set at an optimum value relative to each respective spatial volume occupancy ratio. From the above results, it can be seen that, with batteries that are provided with an explosion-proof seal plate which has been set to an optimum rupture pressure relative to each respective spatial volume occupancy ratio, while the cutoff device operates before ignition of the battery in the event of excessive overcharge, the cutoff device does not operate while being stored at an elevated temperature, thus suggesting that batteries safer than; conventional batteries and with a high reliability can be fabricated.

(3) Fire Throw-in Test:

The fire throw-in test is a test assuming incineration after disposal of batteries, where a battery is burnt in a combustion furnace using charcoal or wood. Status of the battery after the test is observed. In the example batteries A1–A7 of the present invention, the rupture pressure of the upper vent member 1, the rupture pressure of the thin portion of the bottom of the case, and the caulking withstand pressure of the sealing part of the seal plate were respectively set at 18–24 kgf/cm$^2$, 40–60 kgf/cm$^2$, and 70–90 kgf/cm$^2$. As comparative examples, batteries D1–D7 were fabricated of which the spatial volume occupancy ratio and the rupture pressure of the lower vent member 2 were the same as those of example batteries A1–A7, the rupture pressure of the upper vent member 1 of the seal plate had been set at 18–24 kgf/cm$^2$, the rupture pressure of the thin portion of the bottom of the case had been set at 17 kgf/cm$^2$, and the caulking withstand pressure of the sealing part of the seal plate had been set at 70–90 kgf/cm$^2$; comparative batteries E1–E7 were fabricated of which the rupture pressure of the upper vent member 1 had been set at 18–24 kgf/cm$^2$, the rupture pressure of the thin portion of the bottom of the case had been set at 40–60 kgf/cm$^2$, and the caulking withstand pressure of the sealing part of the seal plate had been set at 30 kgf/cm$^2$. Table 3 shows the results of fire throw-in test of the example batteries of the present invention and the comparative example batteries.

TABLE 3

| Battery type | | Upper vent member rupture pressure (kgf/cm$^2$) | Rupture pressure of case bottom thin portion (kgf/cm$^2$) | Caulking withstand pressure of sealing part (kgf/cm$^2$) | Fire throw-in explosion ratio |
|---|---|---|---|---|---|
| Examples | A1–A7 | 18–24 | 40–60 | 70–90 | 0/100 |
| Comparative examples | D1–D7 | 18–24 | 17 | 70–90 | 0/100 |
| | E1–E7 | 18–24 | 40–60 | 30 | 100/100 |

(Note) Spatial volume occupancy ratio and lower vent member rupture pressure of D1–D7 and E1–E7 are the same as those of A1–A7

It can be seen from Table 3 that, though the comparative example batteries D1–D7 did not explode, as the rupture pressure of the thin portion of the bottom of the battery case was lower than the rupture pressure of the upper vent member 1, in the event of a slight increase in the battery internal pressure owing to temperature rise of the battery due to overcharge and other reasons, there occurred an instance in which the thin portion of the bottom of a battery ruptured even in the case safety could be secured by the rupture of the upper vent member 1 only of the seal plate. This may cause leakage of the liquid electrolyte leading to failure of an equipment. Accordingly, a test was conducted on several values of the difference between the rupture pressure of the upper vent member 1 and the rupture pressure of the case bottom thin portion. As a result, it was found preferable that the rupture pressure of the case bottom thin portion be set higher than the upper limit of the rupture pressure of the upper vent member 1 by at least 16 kgf/cm².

On the contrary, it is to be noted that comparative batteries E1–E7 exploded. This is because when a battery was thrown into fire, rapid chemical reaction took place inside the battery accompanying sudden evolution of a gas inside the battery owing to unusual heating. As a result of evolution of a gas in excess of the gas discharge capacity through the rupture of the upper vent member 1 disposed on the seal plate, the battery internal pressure suddenly increased beyond the caulking withstand pressure of the sealing part thus leading to an explosion. Consequently, a test was conducted by setting different values as the difference between the rupture pressure of the case bottom thin portion and the caulking withstand pressure of the sealing part, from which it was found preferable to set the rupture pressure of the case bottom thin portion lower than the lower limit of the caulking withstand pressure of the sealing part by substantially 10 kgf/cm².

On the other hand, the example batteries A1–A7 of the present invention did not reach the state of exploding. It is conceivable that when the battery internal pressure increased by being thrown into fire, gas discharge took place through rupture of the upper vent member 1 before the caulking withstand pressure of the sealing part had been reached, and in the event a volume of gas in excess of the gas discharge capacity evolved, gas discharge was performed through rupture of the case bottom thin portion, suggesting that proper setting of the operating pressure levels controlled the sequence of gas discharge and allowed the evolved gas inside the battery to smoothly discharge to outside of the battery.

In the above exemplary embodiment, although the structure is such that an electric current is cutoff by rupture of the easy-to-rupture portion (thin portion) 2b of the lower vent member 2 in the event the internal pressure of the battery case 7 exceeds a predetermined value, the structure may be configured such that the easy-to-rupture portion 2b is not formed on the lower vent member 2 and the bonded part S ruptures thus cutting off the current. Also, the easy-to-rupture portion provided on the upper vent member 1 and the easy-to-rupture portion provided on the bottom of the battery case can be configured not only by the C-letter shaped thin portions 1b and 7b as shown in the exemplary embodiment but also by various other configurations.

INDUSTRIAL APPLICATION

The present invention provides a safe and explosion-proof non-aqueous secondary battery which is equipped with an electric current cutoff device for cutting off electrical connection within the battery with safety and certainty in the event of overcharge while remaining inoperable in normal use or storage at an elevated temperature, and which is free from the danger of explosion and superior in safety by combination and optimization of explosion-proof devices in the event of evolution of a gas in excess of the gas discharge capacity under a wide range of conditions including bandonment and throwing into fire of the battery.

What is claimed:

1. A method of setting rupture pressure of an explosion-proof non-aqueous secondary battery including a sealing part provided with a pair of upper and lower vent plates mechanically and electrically coupled with each other, wherein the mechanical coupling between said pair of upper and lower vent plates ruptures thus cutting off an electric current in the event the internal pressure of a battery case increased beyond a predetermined value, and in the event the internal pressure of the battery case subsequently further increased beyond a predetermined value, an easy-to-rupture portion formed on the upper vent plate ruptures thus releasing the gas inside the battery case to outside, and the rupture pressure at which the mechanical coupling between said pair of upper and lower vent plates ruptures has been set to decrease as the sspatial volume occupancy ratio of the battery increases.

2. The method of setting rupture pressure of an explosion-proof non-aqueous electrolyte secondary battery of claim 1, wherein the relationship between the spatial volume occupancy ratio of the battery and the rupture pressure of the lower vent plate at which the mechanical coupling between the pair of the upper and lower vent plates is broken has been set as shown in the following:

| Spatial volume occupancy ratio | Rupture pressure (kgf/cm², figures rounded off) | |
|---|---|---|
| (%, figures rounded off) | Cylindrical battery | Rectangular battery |
| 15–20 | 3–11 | 2–5 |
| 10–14 | 4–13 | 3–7 |
| 9 | 5–13 | 4–7 |
| 8 | 5.5–13 | 4–7 |
| 7 | 7–13 | 4–7 |
| 6 | 9–14 | 4–9 |
| 5 | 13–15 | 6–10. |

3. The method of setting rupture pressure of an explosion-proof non-aqueous electrolyte secondary battery of claim 1, wherein the rupture pressure of the easy-to-rupture portion upper vent plate has been set in the range of 18–24 kgf/cm².

4. An explosion-proof non-aqueous electrolyte secondary battery including a sealing part provided with a pair of an upper and lower vent plates mechanically and electrically coupled with each other, wherein the mechanical coupling between the pair of upper and lower vent plates ruptures thus cutting off an electric current in the event the internal pressure of the battery case increased beyond a predetermined value, and in the event the internal pressure of the battery case substantially further increased beyond a predetermined value an easy-to-rupture portion formed on the upper vent plate ruptures thus releasing the gas inside the battery case to outside, and the rupture pressure has been set according to the method of setting rupture pressure as claimed in claim 1.

5. An explosion-proof non-aqueous electrolyte secondary battery including a sealing part provided with a pair of an upper and lower vent plates mechanically and electrically coupled with each other, wherein the mechanical coupling between the pair of upper and lower vent plates ruptures thus cutting off the electric current in the event the internal pressure of the battery case increased beyond a predetermined value, and in the event the internal pressure of the battery case subsequently further increased beyond a predetermined value an easy-to-rupture portion formed on the upper vent plate ruptures thus releasing the gas inside the battery case to outside, and an easy-to-rupture portion is formed on the bottom surface of the of which being set at least 16 kgf/cm² higher than the upper limit of the rupture pressure of the easy-to-rupture portion of the upper vent plate.

6. The explosion-proof non-aqueous electrolyte secondary battery of claim 5, wherein the rupture pressure of the easy-to-rupture portion formed on the bottom surface of the battery case is in the range 40–60 kgf/cm².

7. The explosion-proof non-aqueous electrolyte secondary battery of claim 5, wherein the caulking withstand pressure of the sealing part has been set at least 10 kgf/cm$^2$ higher than the upper limit of the rupture pressure of the easy-to-rupture portion formed on the bottom surface of the battery case.

8. The explosion-proof non-aqueous electrolyte secondary battery of claim 7, wherein the caulking withstand pressure of the sealing part is in the range 70–90 kgf/cm$^2$.

9. The explosion-proof non-aqueous electrolyte secondary battery of claim 4, wherein an easy-to-rupture portion is formed on the bottom surface of the battery case and the rupture pressure of said easy-to-rupture portion has been set at least 16 kgf/cm$^2$ higher than the upper limit of the rupture pressure of the easy-to-rupture portion of the upper vent plate.

10. The explosion-proof non-aqueous electrolyte secondary battery of claim 9, wherein the rupture pressure of the easy-to-rupture portion formed on the bottom surface of the battery case is in the range 40–60 kgf/cm$^2$.

11. The explosion-proof non-aqueous electrolyte secondary battery of claim 9, wherein the caulking withstand pressure of the sealing part has been set 10 kgf/cm$^2$ higher than the upper limit of the rupture pressure of the easy-to-rupture portion formed on the bottom surface of the battery case.

12. The explosion-proof non-aqueous electrolyte secondary battery of claim 11, wherein the caulking withstand pressure of the sealing part is in the range 70–90 kgf/cm$^2$.

13. The method of setting rupture pressure of an explosion-proof non-aqueous electrolyte secondary battery of claim 2, wherein the rupture pressure of the easy-to-rupture portion of the upper vent plate has been set in the range of 18–24 kgf/cm$^2$.

14. An explosion-proof non-aqueous electrolyte secondary battery including a sealing part provided with a pair of an upper and lower vent plates mechanically and electrically coupled with each other, wherein the mechanical coupling between the pair of upper and lower vent plates ruptures thus cutting off an electric current in the event the internal pressure of the battery case increased beyond a predetermined value, and in the event the internal pressure of the battery case substantially further increased beyond a predetermined value an easy-to-rupture portion formed on the upper vent plate ruptures thus releasing the gas inside the battery case to outside, and the rupture pressure has been set according to the method of setting rupture pressure as claimed in claim 2.

15. An explosion-proof non-aqueous electrolyte secondary battery including a sealing part provided with a pair of an upper and lower vent plates mechanically and electrically coupled with each other, wherein the mechanical coupling between the pair of upper and lower vent plates ruptures thus cutting off an electric current in the event the internal pressure of the battery case increased beyond a predetermined value, and in the event the internal pressure of the battery case substantially further increased beyond a predetermined value an easy-to-rupture portion formed on the upper vent plate ruptures thus releasing the gas inside the battery case to outside, and the rupture pressure has been set according to the method of setting rupture pressure as claimed in claim 3.

16. The explosion-proof non-aqueous electrolyte secondary battery of claim 6, wherein the caulking withstand pressure of the sealing part has been set at least 10 kgf/cm$^2$ higher than the upper limit of the rupture pressure of the easy-to-rupture portion formed on the bottom surface of the battery case.

17. The explosion-proof non-aqueous electrolyte secondary battery of claim 10, wherein the caulking withstand pressure of the sealing part has been set 10 kgf/cm$^2$ higher than the upper limit of the rupture pressure of the easy-to-rupture portion formed on the bottom surface of the battery case.

* * * * *

UNITED STATES PATENT AND TRADEMARK OFFICE
CERTIFICATE OF CORRECTION

PATENT NO.    : 6,258,477 B1
DATED         : July 10, 2001
INVENTOR(S)   : Kashihara et al.

It is certified that error appears in the above-identified patent and that said Letters Patent is hereby corrected as shown below:

<u>Column 9,</u>
Line 65, insert -- (vent member) -- before the word "mechanically".

<u>Column 10,</u>
Line 34, insert -- of the -- before the word "upper".
Line 43, delete "substantially" and insert -- subsequently --.
Line 60, insert -- battery case the rupture pressure -- after the words "surface of the".

Signed and Sealed this

Twenty-fourth Day of December, 2002

JAMES E. ROGAN
*Director of the United States Patent and Trademark Office*